United States Patent [19]

LoGalbo et al.

[11] Patent Number: 5,796,784
[45] Date of Patent: Aug. 18, 1998

[54] METHOD AND APPARATUS FOR MODIFYING AMPLITUDE OF AT LEAST ONE SYMBOL

[75] Inventors: Robert D. LoGalbo, Bartlett; Donald G. Newberg, Hoffman Estates; Bradley M. Hiben, Glen Ellyn, all of Ill.

[73] Assignee: Motorola, Inc., Schaumburg, Ill.

[21] Appl. No.: 624,042

[22] Filed: Mar. 27, 1996

[51] Int. Cl.$^6$ ............................. H04L 27/36; H04L 27/20
[52] U.S. Cl. ..................... 375/298; 375/308; 332/103
[58] Field of Search ........................... 375/261, 264, 375/698, 279, 280, 281, 283, 308; 332/103

[56] References Cited

U.S. PATENT DOCUMENTS

| | | | |
|---|---|---|---|
| 3,619,503 | 11/1971 | Ragsdale | 375/269 |
| 3,706,945 | 12/1972 | Yanagidaira et al. | 332/104 |
| 3,983,485 | 9/1976 | Stuart | 375/269 |
| 4,745,628 | 5/1988 | McDavid et al. | 375/296 |
| 4,773,082 | 9/1988 | Somer et al. | 375/296 |
| 4,962,510 | 10/1990 | McDavid et al. | 375/308 |
| 5,091,919 | 2/1992 | Kuisma | 375/296 |
| 5,105,442 | 4/1992 | Wei | 375/261 |
| 5,377,194 | 12/1994 | Calderbank | 370/524 |
| 5,381,449 | 1/1995 | Jasper et al. | 375/295 |
| 5,386,202 | 1/1995 | Cochran et al. | 332/100 |
| 5,481,567 | 1/1996 | Betts et al. | 375/261 |
| 5,621,762 | 4/1997 | Miller et al. | 375/298 |
| 5,629,961 | 5/1997 | Kawabata | 375/308 |

FOREIGN PATENT DOCUMENTS

| | | | |
|---|---|---|---|
| 61-193543 | 8/1986 | Japan | 375/264 |

Primary Examiner—Stephen Chin
Assistant Examiner—Jeffrey W. Gluck
Attorney, Agent, or Firm—Christopher P. Moreno

[57] ABSTRACT

In a modulator (300), a symbol weight determiner (301) determines a scaling factor (310) for at least one symbol (308). An integrator (303) and a complex symbol generator (305) operate to produce at least one complex symbol (314) based on the at least one symbol. The scaling factor (310) is used to scale the at least one complex symbol. In one embodiment, a scaler (307) comprises a gain-modifiable amplifier (609) and, in a second embodiment, the scaler comprises a gain-modifiable filter (809). When such a modulator is incorporated into an RF communication device (600, 800), the energy used to transmit any given symbol can be varied according to the relative importance of that symbol. Additionally, the overall received sensitivity of a communication, at a given signal strength, can be improved.

21 Claims, 4 Drawing Sheets

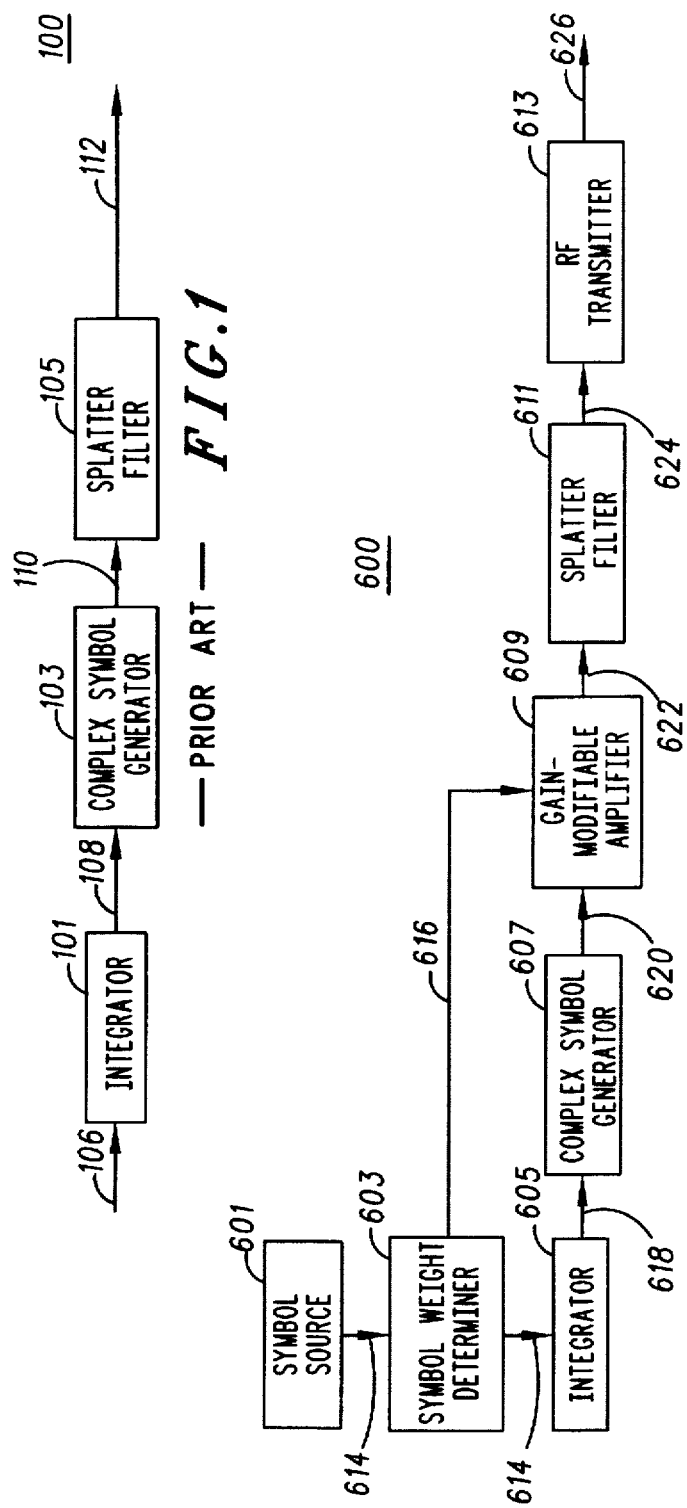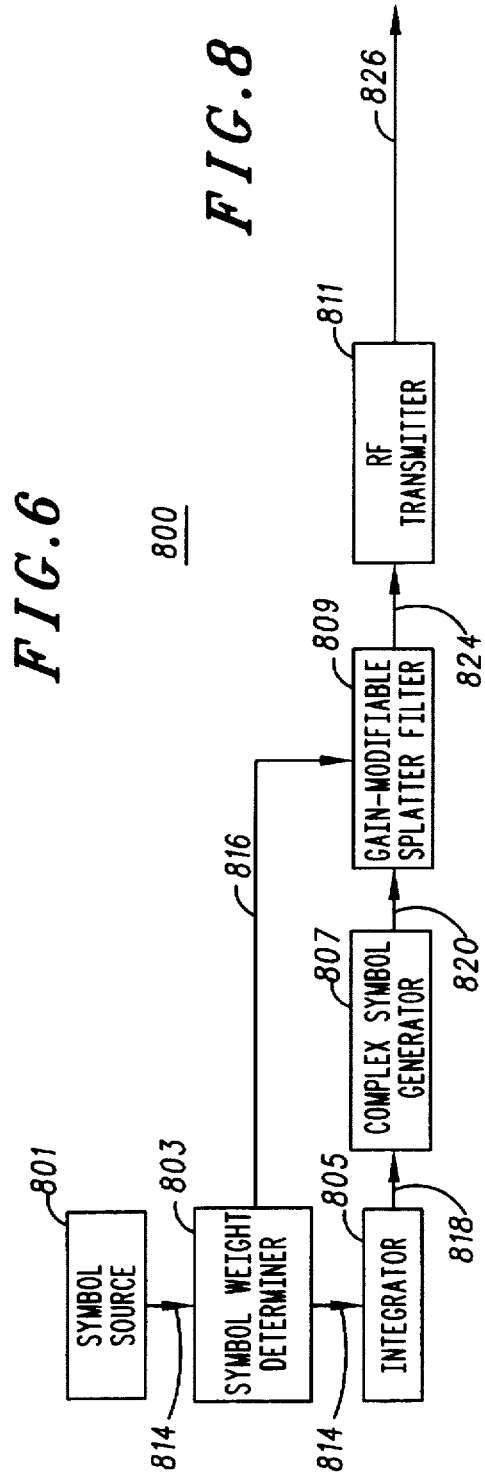

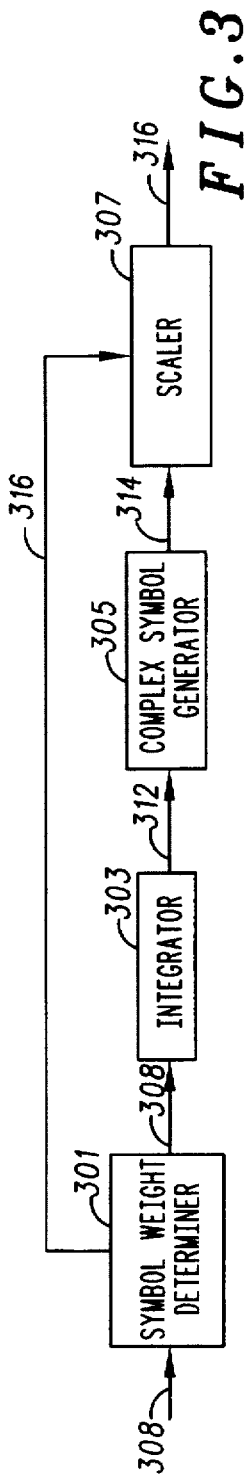
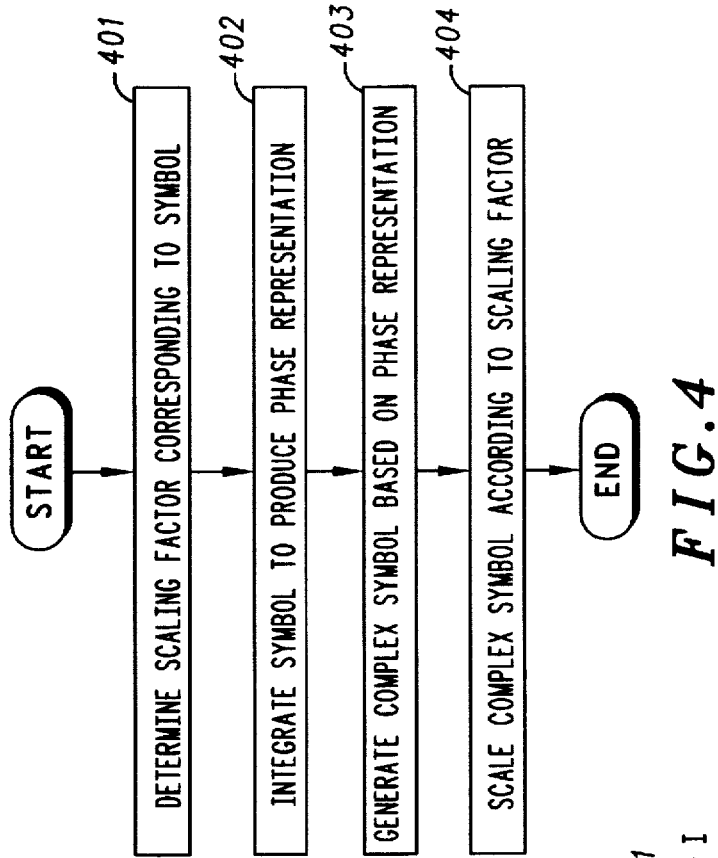
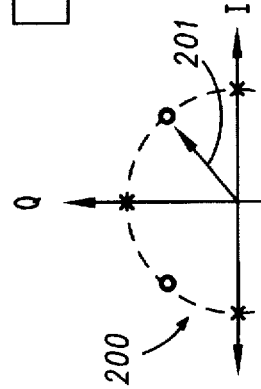

5,796,784

1

METHOD AND APPARATUS FOR MODIFYING AMPLITUDE OF AT LEAST ONE SYMBOL

FIELD OF THE INVENTION

The present invention relates generally to wireless communications and, in particular, to a method and apparatus for modifying symbols.

BACKGROUND OF THE INVENTION

The use of symbols in wireless communication systems is generally known. Typically, a symbol is a representation of one or more binary bits and is used to modulate a parameter of a wireless communication resource, such as a radio frequency (RF) carrier. Thus, digitally represented information is used to create a stream of symbols which are then transmitted to a receiver. Upon recovery of the symbols at the receiver, the digital information can be reconstructed. This allows more efficient use of available communication resources in wireless communication systems.

For example, in systems conforming to requirements recently promulgated by the Association of Public Safety Communication Officers (APCO) such symbols cause, and are therefore represented by, phase shifts in a carrier signal. More precisely stated, the APCO 25 Common Air Interface (CAI) specifies a version of π/4-quadrature phase shift keying (π/4-QPSK) as the required modulation type. A modulator 100, as specified by the APCO 25 CAI, is shown in FIG. 1.

At the front end of the modulator 100, symbols 106 are input to an integrator 101. The symbols 106 are real-valued representations of one or more binary bits. The integrator 101 produces phase representations 108 of the symbols 106. A complex symbol generator 103 modulates the phase representations 108 into complex symbols 110. The resulting complex symbols 110 are then processed by a splatter filter 105 to produce splatter-filtered complex symbols 112. (The operations of the integrator 101, complex symbol generator 103, and splatter filter 105 are well known in the art and will not be discussed further.) In practice, the splatter-filtered complex symbols 112 are then transmitted via a suitable device, such as an RF transmitter.

The modulator 100 of FIG. 1 results in a constellation pattern 200 as shown in FIG. 2. In particular, the constellation pattern 200 (shown within a complex I-Q plane) results when the splatter-filtered complex symbols 112 are transmitted. Each splatter-filtered complex symbol 112 transmitted results in a phase shift between constellations points (represented by alternating x's and o's). Each of the constellation points lies along a single level of constant energy (shown as a circular dotted line) as determined by a radius 201. Using this method, the average transmitted power will approximately remain the same, regardless of the symbols being transmitted.

In particular, symbols that may be relatively unimportant to a given communication (e.g., symbols related to encryption synchronization in an unencrypted communication) are still transmitted with the same amount of energy as other symbols more crucial to the overall success of the communication. Given that most portable communication units (e.g., a hand-held portable radio) have a limited battery life, the unnecessary use of excess power is to be avoided.

In addition to the above, it is well known in the art that each symbol or block of symbols does not have the same importance as some other symbol or block or symbols. A

2 method to equalize this disparity is to apply different error correction methods to improve the sensitivity of different symbols. Differently encoded symbols will likely have dissimilar probabilities of being successfully decoded by a receiver for a given bit error rate (BER).

For example, in a land mobile radio environment, certain functions (e.g., audio unsquelch) depend upon a sequence of successful decodes (in the sense of no uncorrectable bit errors) of specific symbols. As a result, the overall sensitivity of a given communication may not be better than the sensitivity of any one portion of the communication. That is, while other symbols important to a communication (e.g., symbols related to vocoder parameters in a voice message) are successfully decoded, those symbols required to allow the communication to proceed at the receiver (i.e., audio unsquelch) may not be successfully decoded, thereby preventing the successful completion of the communication in the first place.

In light of the above, it would be advantageous to provide a technique that allows the reliability of various symbols or blocks of symbols to be varied such that the overall sensitivity for a communication is maximized for a given signal strength. Additionally, such a technique should allow the energy used to transmit symbols to vary according to the relative importance of each symbol to a communication such that power conservation can be improved, if necessary.

BRIEF DESCRIPTION OF THE DRAWINGS

FIG. 1 is a block diagram of a modulator in accordance with the prior art.

FIG. 2 illustrates a constellation pattern in which there is one level of energy.

FIG. 3 is a block diagram of a modulator for modifying at least one symbol.

FIG. 4 is a flow chart of a method for modifying at least one symbol.

FIG. 5 illustrates a constellation pattern in which there is more than one level of energy.

FIG. 6 is a block diagram of an RF communication device the incorporates a first embodiment of a modulator.

FIG. 8 is a block diagram of an RF communication device the incorporates a second embodiment of a modulator.

DESCRIPTION OF A PREFERRED EMBODIMENT

The present invention provides an apparatus and method for modifying at least one symbol based in part upon its relative importance to a given communication. A modulator comprising a symbol weight determiner, an integrator, a complex symbol generator, and a scaler is provided. Such a modulator can be incorporated into an RF communication device that utilizes phase-modulation techniques. In operation, the symbol weight determiner determines a scaling factor for at least one symbol based on a symbol weighting function. The integrator produces a phase representation of the at least one symbol, and the complex symbol generator produces at least one complex symbol corresponding to the phase representation of the at least one symbol. The resulting at least one complex symbol is scaled by the scaler according to the previously determined scaling factor.

In one embodiment, the scaler comprises a gain-modifiable amplifier and, in a second embodiment, the scaler comprises a gain-modifiable filter. When such a modulator is incorporated into an RF communication device, the energy used to transmit any given symbol can be varied according to the relative importance of that symbol. Additionally, the overall received sensitivity of a communication, at a given signal strength, can be improved.

Figure 7:
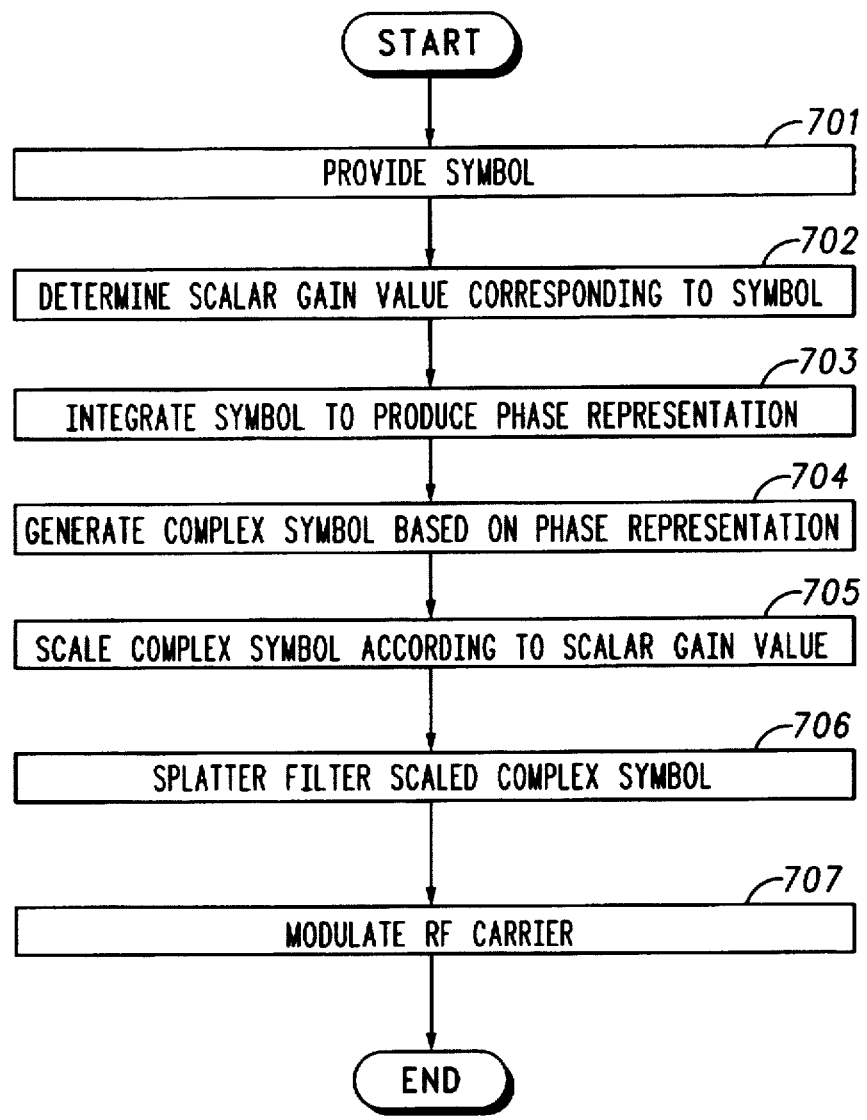
FIG. 7 is a flow chart of a method in accordance with the RF communication device of FIG. 6.
Figure 9:
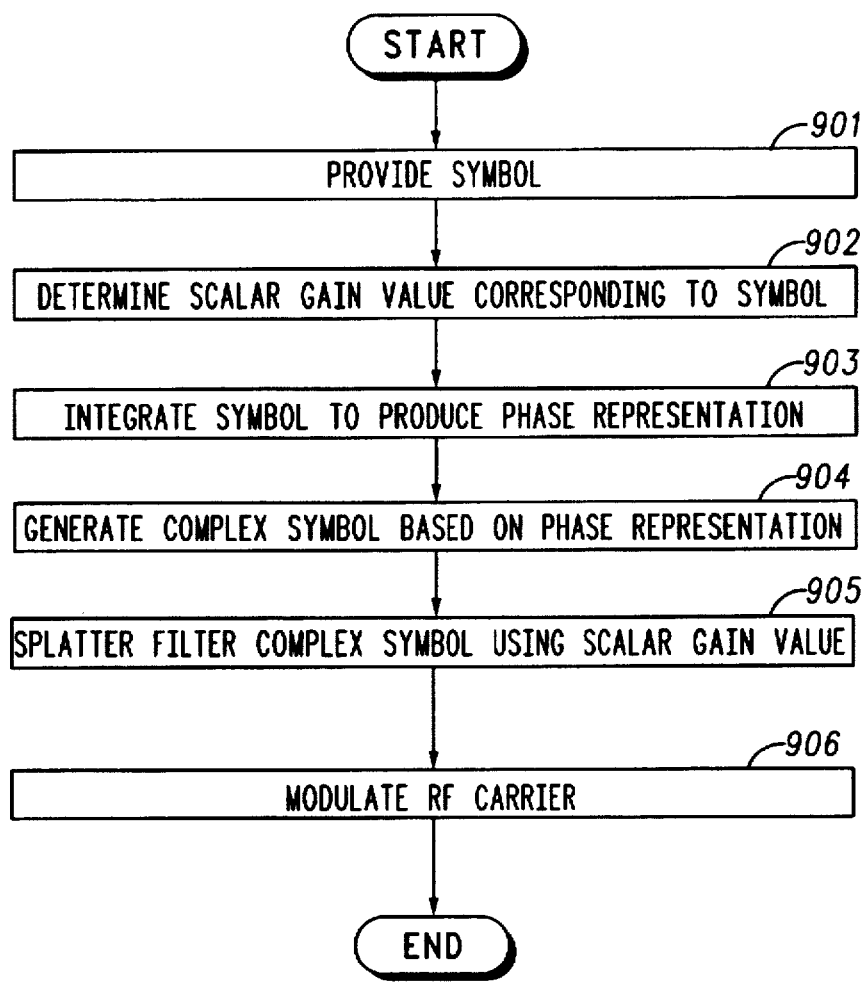
FIG. 9 is a flow chart of a method in accordance with the RF communication device of FIG. 8.

The present invention can be more readily described with reference to FIGS. 3–9. FIGS. 3 and 4 illustrate a general embodiment of the present invention. FIG. 3 is a block diagram of a modulator 300 for modifying at least one symbol, and FIG. 4 is a flow chart of a method for doing the same. In practice, the modulator 300 and its constituent components can be implemented using hardware devices, although a software-based implementation (i.e., algorithms stored as instructions in machine-readable memory for execution by a processing device, such as a microprocessor) is preferred. At step 401, a symbol weight determiner 301 determines, based on a symbol weighting function, a scaling factor 310 for at least one symbol 308. The at least one symbol 308 is a real-valued representation of one or more binary bits. As discussed in greater detail below, the symbol weighting function can be any decision function that incorporates objective or subjective determinations of the relative importance of various symbols to be transmitted.

At step 402, an integrator 303 produces a phase representation of the at least one symbol 312 using well known techniques. Generally, the phase representation of the at least one symbol 312 comprises a real-valued scalar in the range from 0–2π radians. At step 403, a complex symbol generator 305 produces at least one complex symbol 314 based on the phase representation of the at least one symbol 312. The operation of the integrator 303 and the complex symbol generator 305 are well known in the art.

At step 404, a scaler 307 is used to scale the at least one complex symbol 314 according to the scaling factor 310. In a first embodiment of the present invention, the scaler 307 comprises a gain-modifiable amplifier. In a second embodiment of the present invention, the scaler 307 comprises a gain-modifiable filter. Regardless of the particular implementation used, the resulting at least one scaled complex symbol 316 reflects the relative importance of its corresponding at least one symbol 308. (As discussed below, the at least one scaled complex symbol 316 will also be splatter filtered if the second embodiment is used.) A constellation pattern 500 corresponding to the at least one scaled complex symbol 316 is depicted in FIG. 5.

The constellation pattern 500 comprises two levels of constant energy (shown as circular dotted lines), as determined by a first radius 501 and a second radius 502. Although two levels of constant energy are shown, any constellation point (represented by alternating x's and o's) at a given phase angle can lie along only one of the two levels of energy at any given time. That is, although there appear to be 16 constellation points shown, FIG. 5 actually depicts the two possible energy levels that each of the 8 constellation points can occupy.

For example, consider the constellation point corresponding to a positive Q component and zero I component. As shown, the constellation point can occupy either the first level of energy 504 or the second level of energy 505, but not both. Whether a particular symbol results in a phase transition ending on either the first or second energy level is determined by the scaling factor for that symbol. The present invention anticipates that the first radius 501 and the second radius 502 can be chosen so as to maintain, decrease, or even increase the average transmitted power relative to another constellation pattern, e.g., constellation pattern 200 of FIG. 2.

Furthermore, it is anticipated that more than two levels of constant energy can be used.

FIG. 6 is a block diagram of an RF communication device 600 that incorporates a first embodiment of a modulator. In particular, the RF communication device 600 comprises a symbol source 601, a symbol weight determiner 603, an integrator 605, a complex symbol generator 607, a gain-modifiable amplifier 609, a splatter filter 611, and an RF transmitter 613 operably coupled as shown. The first embodiment of the modulator encompasses the symbol weight determiner 603, the integrator 605, the complex symbol generator 607, the gain-modifiable amplifier 609 and, in practice, the splatter filter 611. Operation of the RF communication device 600 is further described with reference to FIG. 7.

At step 701, the symbol source 601 provides at least one symbol 614. Typically, the symbol source 601 comprises any of a number of hardware devices or software processes that cause symbols to be generated. For example, a voice compression algorithm (commonly referred to as a vocoder) can create a stream of digitally represented parameters (later converted to symbols) corresponding to voice signal input. Alternatively, a high level software routine may create symbols representing required encryption synchronization information, which symbols are periodically interleaved with the other information to be transmitted. In practice, the symbol source 601 provides a constant stream of symbols so long as the RF communication device 600 is in the process of transmitting.

Furthermore, such a constant stream of symbols will typically follow a repetitive pattern of symbols. That is, symbols representing various types of information will always be periodically sent, regardless of the operating mode of the RF communication device 600. For example, the APCO 25 CAI standard specifies two different link data units (LDUs), each of which is a unique frame format. Each is sent alternately, in the form of a stream of symbols, during any given transmission. Between the two types of LDUs, all fields necessary to implement all possible system features are represented. However, it is rare that all fields in all transmitted LDUs contain information crucial to the successful completion of a particular communication.

At step 702, the symbol weight determiner 603 determines a scaling factor, in the form of a scalar gain value 616, for the at least one symbol 614 based on a symbol weighting function. As mentioned above, the symbol weighting function can be any decision function that incorporates objective or subjective determinations of the relative importance of various symbols to be transmitted. For example, an objective determination of relative importance would be the operating mode of the RF communication device 600. Thus, the relative importance of various symbols can be predicated on whether the RF communication device 600 is in a conventional or trunking mode, an encrypted or non-encrypted mode, or even if the RF communication device 600 is a mobile/portable radio or a fixed base station. An example of a subjective determination is perceptual weighting of various parameters (i.e., how important a given parameter is in the reconstruction of compressed voice signals) for a given vocoder, or even between different vocoders.

Additionally, the symbol weighting function takes into account the type of symbol being transmitted. For example, in a given operating mode, an encryption-related symbol could be of different importance relative to a trunking-related symbol. In one embodiment, the symbol weighting function could be implemented as a lookup table, indexed by the current operating mode. The lookup table would be further sub-indexed by the type of the at least one symbol 614 being sent, wherein the lookup table lists the appropriate scalar gain values for any given symbol.

Furthermore, the symbol weighting function can take into account a value of the at least one symbol or its value relative to a predetermined sequence of prior and subsequent symbols. Thus, the symbol weighting function provides a potentially different scalar gain value for each possible value for the at least one symbol as indexed above. Furthermore, by tracking the values of symbols both prior and subsequent to the at least one symbol, the symbol weighting function could detect a predetermined sequence of symbols and, when detected, supply various scalar gain values for the at least one symbol. Although several objective and subjective determinations and symbol types have been given as examples, the present invention is equally applicable to a large variety of criteria, depending upon the particular application.

At step 703, the integrator 605 produces a phase representation of the at least one symbol 618. In essence, the phase representation of the at least one symbol 618 is representative of the difference between the at least one symbol 614 and a previous symbol, as known in the art.

At step 704, the complex symbol generator 607 produces at least one complex symbol 620 based on the phase representation of the at least one symbol 618. The at least one complex symbol 620 is a typically a representation of the at least one symbol 614 as in-phase (I) and quadrature (Q) components, as known in the art.

At step 705, a gain-modifiable amplifier 609 scales the at least one complex symbol 620 according to the scalar gain value 616. The gain-modifiable amplifier 609 may comprise a physical amplifier device, of the sort well known in the art, in which case that scalar gain value 616 is a control voltage that determines the gain value of the amplifier device. Alternatively, the gain-modifiable amplifier 609 may comprise a complex multiplier function implemented in software, in which case the scalar gain value 616 is a multiplicand. Regardless of the implementation, the resulting at least one scaled complex symbol 622 reflects the relative weight given to the at least one symbol 614 according to the symbol weighting function.

At step 706, the splatter filter 611 filters the at least one scaled complex symbol 622. In practice, the splatter filter may be implemented in either hardware, as a filter network, or as a software algorithm, as known in the art. Although not a requirement for the physical operation of the RF communication device 600—the scaled complex symbol could be transmitted without further filtering—the splatter filter 611 is typically used to limit adjacent-channel interference. It has been demonstrated that the present invention exhibits substantially identical spectral performance as prior art techniques (assuming the same average transmit power).

At step 707, the at least one splatter-filtered scaled complex symbol 624 produced by the splatter filter 611 is sent to the RF transmitter 613 which, in turn, modulates an RF carrier 626 based on the at least one splatter-filtered scaled complex symbol 624. In the preferred embodiment, the RF transmitter 613 produces phase variations in the RF carrier 626 based on the at least one splatter-filtered scaled complex symbol 624. The energy of the RF carrier 626 will reflect the scaling inherent to the at least one splatter-filtered scaled complex symbol 624. That is, if the at least one splatter-filtered scaled complex symbol 624 reflects a decrease in amplitude relative to other symbols, the power used to transmit it will similarly be decreased. In this manner, power conservation could be achieved, for example, in a portable radio having a limited battery life.

At the other extreme, if the at least one splatter-filtered scaled complex symbol 624 reflects an increase in amplitude relative to other symbols, the power used to transmit it will be similarly increased. In this manner, the received reliability of the at least one splatter-filtered scaled complex symbol 624 can be improved. Additionally, if it is desired to maintain the average transmitted power at the same level as would occur without the use of the present invention (i.e., the modulator and constellation pattern of FIGS. 1 and 2, respectively), the energy saved from decreased amplitude symbols could be applied to increased amplitude symbols, thereby improving overall sensitivity. Overall sensitivity would be improved in the sense that the most important symbols will have improved reliability, and the decreased reliability of the less important symbols would likely not affect the successful completion of the message. It is noted that the present invention, because it alters the amplitude of the RF carrier 626, is not applicable to RF communication devices utilizing amplitude-modulation techniques.

FIG. 8 is a block diagram of an RF communication device 800 that incorporates a second embodiment of a modulator. In particular, the RF communication device 800 comprises a symbol source 801, a symbol weight determiner 803, an integrator 805, a complex symbol generator 807, a gain-modifiable splatter filter 809, and an RF transmitter 811 operably coupled as shown. The difference between the embodiment shown in FIG. 6 and that shown in FIG. 8 is the effective combination of the gain-modifiable amplifier 609 and splatter filter 611 as the gain-modifiable splatter filter 809. In all other respects, the symbol source 801, the symbol weight determiner 803, the integrator 805, the complex symbol generator 807, and the RF transmitter 811 are functionally equivalent to their counterparts presented with respect to FIGS. 6 and 7. Operation of the RF communication device 800 is further described with reference to FIG. 9.

Because the RF communication device 800 is structurally similar to that shown in FIG. 6, steps 901 through 904 are functionally equivalent to steps 701 through 704, discussed above. However, at step 905, the gain-modifiable splatter filter 809 both splatter filters the at least one complex symbol 820 and effects a gain change to the at least one complex symbol 820 based on the scalar gain value 816. In this embodiment, the gain-modifiable splatter filter 809 is a linear function. As a result of this linearity, the scalar gain value 816 can be applied to the at least one complex symbol 820 prior to actual processing by the filter (this would be functionally equivalent to the embodiment described in FIG. 6), or the scalar gain value 816 can be incorporated into the filter itself, modifying filter taps as the at least one complex symbol 820 progresses through the filter.

At step 906, the resulting at least one splatter-filtered scaled complex symbol 824 is then sent to the RF transmitter 811. Operation of the RF transmitter, and the effect upon the RF carrier 826, is equivalent to that described above with respect to FIGS. 6 and 7. The benefits achieved by the embodiment of FIG. 8 is equivalent to those achieved by the embodiment of FIG. 6.

The present invention provides an apparatus and method for modifying at least one symbol based in part upon its relative importance to a given communication. Prior art techniques restricted the transmission of all symbols to a single level of energy. By scaling symbols in accordance with their relative importance to a given message, as determined by a symbol weighting function, the present invention allows the average energy used to transmit the symbols to be increased, decreased, or maintained. Additionally, by allocating energy from relatively unimportant (but otherwise required) symbols to relatively important symbols, the overall sensitivity of a communication can be improved for a given average power. For example, if a lower gain is applied to low priority symbols and a higher gain is applied to high priority symbols, the overall sensitivity of the message is improved to the extent that the reliability of those symbols crucially related to the successful completion of the message is improved.

We claim:

1. An apparatus for modifying at least one symbol, the apparatus comprising:
    a symbol weight determiner that takes as input the at least one symbol and determines a scaling factor, corresponding to the at least one symbol, according to a symbol weighting function based at least upon an operating mode and a type of the at least one symbol;
    an integrator that takes as input the at least one symbol and produces a phase representation of the at least one symbol;
    a complex symbol generator, coupled to the integrator, that takes as input the phase representation of the at least one symbol and produces at least one complex symbol; and
    a scaler, coupled to the complex symbol generator and the symbol weight determiner, that takes as input the at least one complex symbol and the scaling factor, and produces at least one scaled complex symbol, the at least one scaled complex symbol having been scaled according to the scaling factor.

2. The apparatus of claim 1, the scaler further comprising a gain-modifiable amplifier.

3. The apparatus of claim 1, the scaler further comprising a gain-modifiable filter.

4. The apparatus of claim 3, the gain-modifiable filter further comprising a gain-modifiable splatter filter.

5. An RF communication device comprising:
    a symbol source that produces at least one symbol;
    a symbol weight determiner, coupled to the symbol source, that takes as input the at least one symbol and determines a scalar gain value, corresponding to the at least one symbol, according to a symbol weighting function based at least upon an operating mode and a type of the at least one symbol;
    an integrator that takes as input the at least one symbol and produces a phase representation of the at least one symbol;
    a complex symbol generator, coupled to the integrator, that takes as input the phase representation of the at least one symbol and produces at least one complex symbol;
    a gain-modifiable amplifier, coupled to the complex symbol generator and the symbol weight determiner, that takes as input the at least one complex symbol and the scalar gain value, and produces at least one scaled complex symbol, the at least one scaled complex symbol having been scaled according to the scalar gain value;
    a splatter filter, operably coupled to the gain-modifiable amplifier, that takes as input the at least one scaled complex symbol and produces at least one splatter-filtered scaled complex symbol; and
    an RF transmitter, coupled to the splatter filter, that modulates an RF carrier based on the at least one splatter-filtered scaled complex symbol.

6. An RF communication device comprising:
    a symbol source that produces at least one symbol;
    a symbol weight determiner, coupled to the symbol source, that takes as input the at least one symbol and determines a scalar gain value, corresponding to the at least one symbol, according to a symbol weighting function;
    an integrator that takes as input the at least one symbol and produces a phase representation of the at least one symbol;
    a complex symbol generator, coupled to the integrator, that takes as input the phase representation of the at least one symbol and produces at least one complex symbol;
    a gain-modifiable splatter filter, coupled to the complex symbol generator and the symbol weight determiner, that takes as input the at least one complex symbol and the scalar gain value, and produces at least one splatter-filtered scaled complex symbol; and
    an RF transmitter, coupled to the gain-modifiable splatter filter, that modulates an RF carrier based on the at least one splatter-filtered scaled complex symbol.

7. A method for modifying at least one symbol, the method comprising steps of:
    determining, by a symbol weight determiner, a scaling factor corresponding to the at least one symbol according to a symbol weighting function based at least upon an operating mode and a type of the at least one symbol;
    integrating, by an integrator, the at least one symbol to produce a phase representation of the at least one symbol;
    generating, by a complex symbol generator, at least one complex symbol based on the phase representation of the at least one symbol; and
    scaling, by a scaler, the at least one complex symbol according to the scaling factor to produce at least one scaled complex symbol.

8. The method of claim 7, wherein the symbol weighting function is based on a value of the at least one symbol.

9. The method of claim 8, wherein the symbol weighting function is based on the value of the at least one symbol relative to a predetermined sequence of prior and subsequent symbols.

10. The method of claim 7, wherein the scaling factor is a scalar gain value.

11. The method of claim 10, wherein, in the step of scaling the at least one complex symbol, the scalar gain value modifies a gain value for a gain-modifiable amplifier that operates on the at least one complex symbol to produce at least one scaled complex symbol.

12. The method of claim 10, wherein, in the step of scaling the at least one complex symbol, the scalar gain value modifies at least one filter coefficient for a gain-modifiable splatter-filter that operates on the at least one complex symbol to produce at least one splatter-filtered scaled complex symbol.

13. In an RF communication device, a method for modulating an RF carrier, the method comprising steps of:
    providing at least one symbol;

determining a scalar gain value corresponding to the at least one symbol according to a symbol weighting function based at least upon an operating mode and a type of the at least one symbol;

integrating the at least one symbol to produce a phase representation of the at least one symbol;

generating at least one complex symbol based on the phase representation of the at least one symbol;

scaling the at least one complex symbol according to the scalar gain value to produce at least one scaled complex symbol;

splatter filtering the at least one scaled complex symbol to produce at least one splatter-filtered scaled complex symbol; and modulating the RF carrier based on the at least one splatter-filtered scaled complex symbol.

14. The method of claim 13, wherein the scalar gain value is selected so as to maintain an average transmitted power level for the RF communication device.

15. The method of claim 13, wherein the scalar gain value is selected so as to decrease an average transmitted power level for the RF communication device relative to the average transmitted power level when the scalar gain value is not used.

16. In an RF communication device, a method for modulating an RF carrier, the method comprising steps of:

providing at least one symbol;

determining a scalar gain value corresponding to the at least one symbol according to a symbol weighting function;

integrating the at least one symbol to produce a phase representation of the at least one symbol;

generating at least one complex symbol based on the phase representation of the at least one symbol;

splatter filtering the at least one complex symbol to produce at least one splatter-filtered scaled complex symbol, wherein gain applied by the splatter filtering is based at least in part upon the scalar gain value; and modulating the RF carrier based on the at least one splatter-filtered scaled complex symbol.

17. The method of claim 16, wherein the symbol weighting function comprises a table lookup based on an operating mode and a type of the at least one symbol.

18. The method of claim 17, wherein the symbol weighting function is based on a value of the at least one symbol.

19. The method of claim 18, wherein the symbol weighting function is based on the value of the at least one symbol relative to a predetermined sequence of prior and subsequent symbols.

20. The method of claim 17, wherein the scalar gain value is selected so as to maintain an average transmitted power level for the RF communication device.

21. The method of claim 17, wherein the scalar gain value is selected so as to decrease an average transmitted power level for the RF communication device relative to the average transmitted power level when the scalar gain value is not used.

\* \* \* \* \*